United States Patent Office 2,905,713
Patented Sept. 22, 1959

2,905,713

CARBODIIMIDES

Erich Schmidt, Munich, and Karl Wamsler, Hamburg, Germany, assignors to Farbenfabriken Bayer Aktiengesellschaft, Leverkusen, Germany, a corporation of Germany No Drawing. Application December 28, 1956
Serial No. 631,048

Claims priority, application Germany January 3, 1956

6 Claims. (Cl. 260—551)

The present invention relates to the production of carbodiimides and more particularly to a process of producing carbodiimides from substituted thiocarbamides.

Monosubstituted carbodiimides (cyanamides) were hitherto only obtainable by the reaction of amines with cyanogen chloride. A further synthesis consists in first reacting amines with hypochlorite to the chloryl compound and then converting the same with sodium cyanide into the corresponding alkyl cyanamide (U.S. Patent No. 2,656,383). In U.S. Patent No. 2,656,883 there is described a process, whereby numerous derivatives of N,N'-disubstituted carbodiimides can be obtained in good yield from the analogous thiocarbamides by contacting the same in aqueous alkaline solution with an alkali metal hypohalite. Lesser yields are obtained according to the known process, if a substituent of the thiocarbamide employed contains a basic group. For the production of monosubstituted carbodiimides (cyanamides) the process is unsuited.

It is therefore an object of the present invention to provide an improved process for the production of carbodiimides. A further object of the invention consists in the provision of the process of producing monosubstituted carbodiimides. Still another object of the invention is the provision of a process by which carbodiimides may be obtained in good yields, which carry substituents with basic amino groups. Another object is a process for the continuous production of such carbodiimides. Still further objects will become apparent as the following specification proceeds.

We have found, that monosubstituted carbodiimides (cyanamides) and derivatives of N,N-disubstituted carbodiimides, including those containing basic radicals, may be obtained in excellent yields by contacting the analogous thiocarbamides with aqueous solutions of alkali metal chlorites, especially with sodium chlorite. The reaction is accelerated and completed by the addition of cuprous salts, especially cuprous-chloride. For carrying out the reaction the mono- or N,N'-disubstituted thiocarbamide is mixed in the presence of a water immiscible solvent at room temperature with an excess of an aqueous alkaline or aqueous ammoniacal solution of the alkali metal chlorite by stirring. Then, the copper salt is introduced and the reaction mixture is cooled if necessary. After the reaction has subsided, which can be observed from the lowering of the temperature, the solvent layer is separated from the aqueous layer. The carbodiimides is found in the solvent layer and can be obtained by distilling off the solvent. The reaction proceeds so simply that it is also suitable for continuous production, for instance as described in U.S. Patent No. 2,656,383.

Suitable mono- or N,N'-disubstituted thiocarbamides are for instance:

N-tert.butyl thiocarbamide
N-isopropyl thiocarbamide
N-pentyl thiocarbamide
N-octyl thiocarbamide
N-cyclohexyl thiocarbamide
N-phenyl-thiocarbamide
N-γ-diethylamino propyl thiocarbamide
N-γ-dimethylamino propyl thiocarbamide
Diisobutyl thiocarbamide
Diisopropyl thiocarbamide
Dicyclohexyl thiocarbamide
Methyl tert.butyl thiocarbamide
N-dimethylamino propyl-N'-tert.butyl thiocarbamide
N-diethylamino propyl-N'-tert.butyl thiocarbamide While according to the known process the optimum yield of basic carbodiimides is about 40%, if basically N,N'-substituted thiocarbamides are employed, yields of over 90% are obtained according to this invention. The yields of mono-substituted carbodiimides are also very good, i.e. about 80% and more. Also bifunctional and polyfunctional thiocarbamides, such as hexamethylene-bis-(tert.butyl thiocarbamide), or of the tris-thiocarbamide, obtained from tri-(amino-propyl)-amine and three mols of tert.butyl isothiocyanate can be employed as starting materials.

The reaction products are useful as modifying agents for cellulose and cellulose derivatives to whom they impart dyeability with acid dyestuffs. Furthermore, they are suitable as cross-linking agents in various cross-linking reactions.

Example 1

One mol of N-tert.butyl thiocarbamide are mixed with stirring with 400 cc. of methylene chloride and with the solution of 220 grams of sodium chlorite and 200 grams of sodium carbonate in 1500 cc. of water. After the addition of 8 grams of cuprous chloride the temperature rises inside 20 minutes to 30 to 32° C. and is kept to that temperature by cooling. After about one hour the temperature subsides slowly and after a total of four hours the mixture has cooled again to room temperature. The amount of oxidation agent used then corresponds to about 1 mol of sodium chlorite per mol of thiocarbamide. The methylene chloride layer is separated from the aqueous layer. The aqueous layer is twice shaken with 200 cc. of methylene chloride each and the combined methylene chloride solutions are washed with 200 cc. of water. The washing water is twice shaken with 100 cc. of methylene chloride each. The methylene chloride solutions are dried over magnesium sulfate, whereupon the solvent is distilled off. The residual N-tert-butyl carbodiimide is distilled off at 62° C. at a pressure of 0.5 mm. Hg. The melting point is 13° C. The yield amounts to 88% of the theoretical.

In an analogous manner the isopropyl carbodiimide of the boiling point 62–63° C. at a pressure of 0.3 mm. Hg is obtained from N-isopropyl thiocarbamide, in a yield of 78%; the tert.octyl carbodiimide is obtained from tert.octyl thiocarbamide, with a boiling point of 140–142° C. at a pressure of 7 mm. Hg, in a yield of 88% while the cyclohexyl carbodiimide can be obtained from cyclohexyl thiocarbamide with the boiling point 20° C. at a pressure of 0.01 mm. Hg.

Example 2

One mol of N-γ-dimethyl amino propyl-N'-tert.butyl thiocarbamide are dissolved in 400 cc. of petroleum ether of the boiling point 30–80° C. The solution is mixed with strongly stirring with the aqueous solution of sodium chlorite and sodium carbonate with the addition of cuprous chloride as described in Example 1. The reaction is carried out exactly as in Example 1 and the recovery of the γ-dimethyl aminopropyl tert.butyl carbodiimide dissolved in the petroleum ether is performed in a manner completely analogous to that in Example 1.

The compound distills at 94–96° C. at a pressure of 10 mm. Hg. The yield amounts to 90% of the theoretical.

*Example 3*

In the same manner the γ-diethylamino propyl tert.butyl carbodiimide is obtained from γ-diethyl amino propyl tert.butyl thiocarbamide with the boiling point 75° C. at 1 mm. Hg pressure, in a yield of 90% of the theory.

We claim:

1. The process which comprises contacting in the presence of cuprous chloride and at a temperature not exceeding 35° C. an excess of an aqueous solution of an alkali metal halite with a thiocarbamide having the general formula $$\underset{R-N-C-NH-R'}{\overset{H\ \ \ S}{\phantom{X}\ \ \ \|}}$$

wherein R is an organic radical selected from the group consisting of lower branched chain alkyl radicals and cycloalkyl radicals and R' designates a member of the group consisting of hydrogen and dialkyl aminoalkyl.

2. The process which comprises contacting in the presence of a small amount of cuprous chloride and at a temperature not exceeding 35° C. N-tert.butyl thiocarbamide with an excess of an aqueous alkaline solution of sodium chlorite, extracting the aqueous reaction mixture with a water immiscible solvent of the class consisting of methylene chloride and petroleum ether, and recovering the pure N-tert.butyl carbodiimide by distillation.

3. The process which comprises contacting in the presence of a small amount of cuprous chloride and at a temperature not exceeding 35° C. isopropyl thiocarbamide with an excess of an aqueous alkaline solution of sodium chlorite, extracting the aqueous reaction mixture with a water immiscible solvent of the class consisting of methylene chloride and petroleum ether, and recovering the pure isopropyl carbodiimide by distillation.

4. A process for the preparation of a mono-substituted cyanamide which comprises reacting an alkali metal halite with a mono-substituted thiourea of the formula $$\underset{R-N-C-NH_2}{\overset{H\ \ \ S}{\phantom{X}\ \ \ \|}}$$

wherein R is an organic radical selected from the group consisting of lower branched chain alkyl radicals and cycloalkyl radicals and the reaction is conducted in the presence of a cuprous chloride catalyst, and recovering as the product a storage-stable cyanamide having the formula $$\underset{R-N-C\equiv N}{\overset{H}{\phantom{X}}}$$

where R is as defined above.

5. A process for the preparation of N,N'-disubstituted carbodiimide which comprises reacting an alkali metal halite with a thiocarbamide having the formula $$\underset{R-N-C-N-C(CH_3)_3}{\overset{\ \ \ \ H\ \ \ S\ \ \ H}{\phantom{X}\ \ \ \ \ \ \|}}$$

wherein R is selected from the group consisting of hydrogen and dialkyl aminoalkyl, the reaction being conducted in the presence of a cuprous chloride catalyst, and recovering as the product a carbodiimide having the formula R—N=C=N—C(CH₃)₃.

6. A process for the preparation of a basically substituted carbodiimide which comprises reacting an aqueous solution of an alkali metal halite with a t-butyl dialkylaminoalkyl thiocarbamide in the presence of a cuprous chloride catalyst, and recovering a t-butyl dialkylaminoalkyl carbodiimide.

References Cited in the file of this patent

UNITED STATES PATENTS 2,656,383     Schmidt et al.  ----------  Oct. 20, 1953

OTHER REFERENCES

Schmidt et al.: 43, Chem. Abst., 1015–16 (1949).